June 5, 1951　　　　　E. M. STOUT　　　　2,555,824
THUMB BRAKE FOR FISHING REEL
Filed Aug. 11, 1947
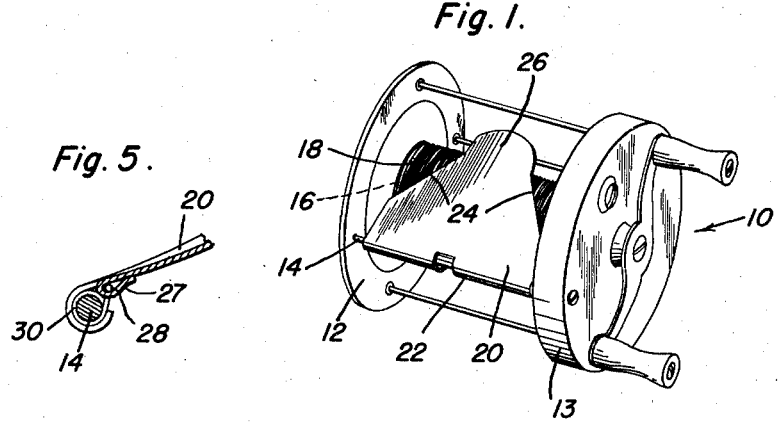
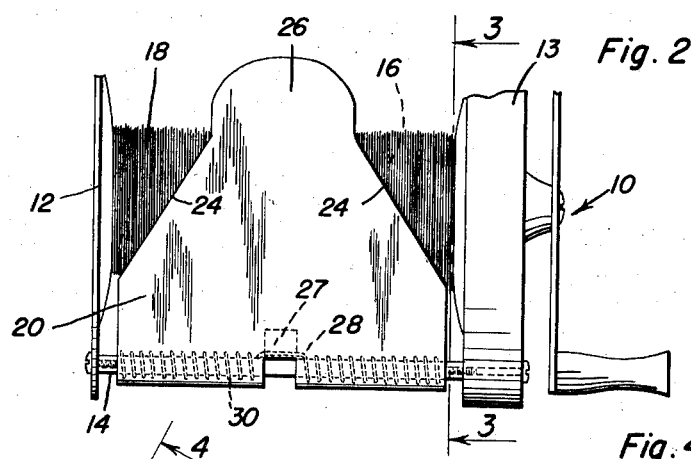
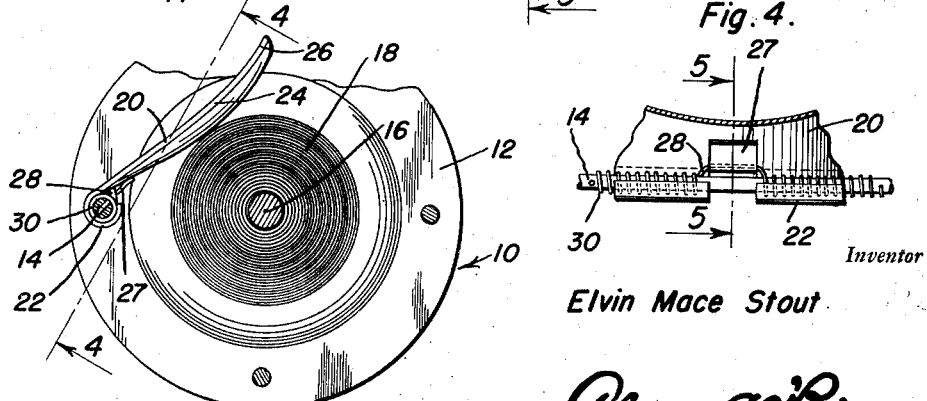
Inventor
Elvin Mace Stout Patented June 5, 1951

2,555,824

UNITED STATES PATENT OFFICE 2,555,824

THUMB BRAKE FOR FISHING REEL

Elvin Mace Stout, Nevis, Minn.

Application August 11, 1947, Serial No. 767,905

2 Claims. (Cl. 242—84.5)

This invention relates to new and useful improvements in thumb brakes for fishing reels and the primary object of the present invention is to provide a thumb rest so mounted as to engage the line holding spool of a reel to prevent backlash occurring which would tangle the line on the reel.

Another important object of the present invention is to provide a thumb actuated member including resilient means for normally spacing the member from the spool so as not to interfere with the usual operation of the spool when in use.

A further object of the present invention is to provide a thumb rest so designed to bear against the entire length of the spool for equalizing the braking engagement of the thumb-rest against the spool.

A still further object of the present invention is to provide a spool brake attachment for fishing reels, that is simple and practical in construction, neat and attractive in appearance, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of a fishing reel embodying the present invention;

Figure 2 is a side elevational view of a reel the thumb rest mounted thereon;

Figure 3 is a vertical transverse sectional view taken on line 3—3 of Figure 2;

Figure 4 is a sectional view taken on line 4—4 of Figure 3, and;

Figure 5 is a sectional view taken on line 5—5 of Figure 4.

Referring now to the drawings in detail, wherein for the purpose of illustration, there is disclosed a preferred embodiment of the present invention, the numeral 10 represents generally a fishing reel of any suitable size, shape or material to which the present thumb brake device is applied. The reel embodies the usual frame comprising end plates 12 and 13 solidly connected to each other by removable pillars 14. In the frame is rotatably mounted a spool 16 on which is spirally wound a line 18.

The thumb brake forming the subject matter of the present invention comprises a concave-convex member 20 terminating in a sleeve 22 at one end that pivotally engages one of the pillars 14. The forward side edges 24 of member 20 preferably converge toward the rounded free end 26 of said member to furnish an elongated area for conveniently receiving a thumb.

A loop or tongue 27 is punched inwardly from the member to bear against the underside of the member and engages a central looped portion 28 provided in a coil spring 30 mounted on the pillar within sleeve 22, as best shown in Figure 5 of the drawings. The terminal portions of the spring 30 are suitably secured to the pillars to space the member 20 normally from the line wound on the spool.

In use of the reel the brake normally is spaced from the line so that the line may be reeled or unreeled. To exert equalized frictional pressure on the entire length of reel it is merely necessary to insert a finger preferably the thumb into the provided surface formed in member 20 and by pressing inwardly against the line wound on the reel the rotary movement of the reel can be slowed down to prevent the line from tangling with the reel.

The present device is adapted for attachment of any standard type of multiplying reel for braking the revolving spool during the casting of a bait and also may be used to remove the moisture from a wet line wound on the spool by pressure means against the line on the spool.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described my invention, what I claim as new is:

1. The combination with a fishing reel having reel pillars and a rotating spool, of a thumb receiving member having a concaved surface for receiving a user's thumb and a convex surface for engaging the spool, one end of said member terminating in a sleeve pivotally engaging one of the pillars, a coil spring mounted on one of the pillars and received within the sleeve, said spring having a central looped portion and means for connecting the sleeve to the spring for spacing said member from the spool, said means comprising a tongue struck from the sleeve and receiving the central looped portion of the spring.

2. In a fishing reel including a rotatable spool and a pillar, a thumb brake, said thumb brake comprising an elongated concavo-convexed member shaped to conform to the contour of a thumb and having a sleeve at one end receiving the pillar, an elongated coil spring embracing the pillar and terminally secured to the pillar, said spring being received in the sleeve and having a central looped portion disposed parallel to the axis of the pillar, and a tongue struck from the sleeve and receiving the central looped portion of the spring to restrict sliding movement of the member on the pillar.

ELVIN M. STOUT.

REFERENCES CITED

The following references are of record in the file of this patent:

UNITED STATES PATENTS

| Number | Name | Date |
| --- | --- | --- |
| 41,494 | Dougherty | Feb. 9, 1864 |
| 699,763 | Mathews | May 13, 1902 |
| 866,060 | Pflueger | Sept. 17, 1907 |
| 1,856,047 | Adams | Apr. 26, 1932 |
| 2,458,047 | Babcock | Jan. 4, 1949 |